US010530831B2

(12) United States Patent
Jansson et al.

(10) Patent No.: US 10,530,831 B2
(45) Date of Patent: Jan. 7, 2020

(54) THREAT PROTECTION FOR REAL-TIME COMMUNICATIONS GATEWAYS

(71) Applicant: Oracle International Corporation, Redwood Shores, CA (US)

(72) Inventors: Andreas E. Jansson, San Francisco, CA (US); Terje Strand, San Francisco, CA (US); Diwakar Goel, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/713,541

(22) Filed: May 15, 2015

(65) Prior Publication Data
US 2016/0337384 A1   Nov. 17, 2016

(51) Int. Cl.
*H04L 29/08* (2006.01)
*H04L 29/06* (2006.01)

(52) U.S. Cl.
CPC .......... *H04L 67/02* (2013.01); *H04L 63/0227* (2013.01); *H04L 63/1408* (2013.01); *H04L 65/105* (2013.01); *H04L 65/1069* (2013.01)

(58) Field of Classification Search
CPC ..................... H04L 63/1416; H04L 67/02
USPC ........................................................ 726/23
See application file for complete search history.

(56) References Cited

U.S. PATENT DOCUMENTS

| 7,472,413 | B1 * | 12/2008 | Mowshowitz | ...... H04L 63/1408 726/10 |
| 9,060,057 | B1 * | 6/2015 | Danis | ................ H04M 3/42059 |
| 2003/0191957 | A1 * | 10/2003 | Hypponen | ............ H04L 63/145 726/24 |
| 2005/0188423 | A1 * | 8/2005 | Motsinger | ........... H04L 63/0876 726/22 |
| 2007/0136139 | A1 * | 6/2007 | Choi | .................... G06Q 20/206 705/18 |
| 2009/0144806 | A1 * | 6/2009 | Gal | ....................... H04L 63/083 726/3 |
| 2010/0281311 | A1 * | 11/2010 | Gao | ...................... H04L 63/168 714/49 |

(Continued)

OTHER PUBLICATIONS

BIG-IP Local Traffic Manager Datasheet; "Application Delivery with Programmable Infrastructure"; http://security.arrowecs.de/FMS/14461.big_ip_local_traffic_manager_en.pdf; last downloaded May 15, 2015.

(Continued)

*Primary Examiner* — Peter C Shaw
(74) *Attorney, Agent, or Firm* — Potomac Law Group, PLLC

(57) ABSTRACT

A system performs threat protection for real-time communications ("RTC"). The system receives, by a signaling engine of a gateway, a request of a client according to a protocol, where the request has successfully traversed one or more security devices between the client and the gateway. The system determines, by a protocol handler corresponding to the protocol, whether the request includes a threat. When the request includes the threat, the system indicates the threat to the one or more security devices, and when the request does not include the threat, the system sends the request to an application server at the gateway.

17 Claims, 9 Drawing Sheets

(56) References Cited

U.S. PATENT DOCUMENTS

| | | | |
|---|---|---|---|
| 2012/0110174 A1* | 5/2012 | Wootton | G06F 21/564 |
| | | | 709/224 |
| 2013/0104230 A1* | 4/2013 | Tang | G06F 21/552 |
| | | | 726/23 |
| 2013/0152153 A1* | 6/2013 | Weiser | H04L 63/0236 |
| | | | 726/1 |
| 2013/0160108 A1* | 6/2013 | Stachel | G06F 21/6218 |
| | | | 726/17 |
| 2014/0222893 A1 | 8/2014 | Gangadharan et al. | |
| 2014/0222894 A1 | 8/2014 | Gangadharan et al. | |
| 2014/0222930 A1 | 8/2014 | Gangadharan et al. | |
| 2014/0222957 A1 | 8/2014 | Gangadharan et al. | |
| 2014/0222963 A1 | 8/2014 | Gangadharan et al. | |
| 2014/0317738 A1* | 10/2014 | Be'ery | H04L 63/14 |
| | | | 726/23 |
| 2016/0065595 A1* | 3/2016 | Kim | H04L 63/101 |
| | | | 726/1 |
| 2016/0294989 A1* | 10/2016 | Perlmutter | H04L 63/02 |

OTHER PUBLICATIONS

Colin Watson et al.; "AppSensor Guide Application-Specific Real Time Attack Detection & Response"; OWASP Open Web Application Security Project; Version 2.0; https://www.owasp.org/images/0/02/Owasp-appsensor-guide-v2.pdf; last downloaded on May 15, 2015.

Weng Feng Liu et al.; "Pluggable API Firewall Filter"; U.S. Appl. No. 14/582,351, filed Dec. 24, 2014.

\* cited by examiner

US 10,530,831 B2

THREAT PROTECTION FOR REAL-TIME COMMUNICATIONS GATEWAYS

FIELD

One embodiment is directed generally to a communications network, and in particular, to security in a communications network.

BACKGROUND INFORMATION

Some communications service providers ("CSPs") and enterprises have deployed real-time communications ("RTC") applications based on the WebRTC protocol. WebRTC is an open Internet standard for embedding real-time multimedia communications capabilities (e.g., voice calling, video chat, peer to peer ("P2P") file sharing, etc.) into a web browser. For any device with a supported web browser, WebRTC can use application programming interfaces ("APIs") to equip the device with RTC capabilities without requiring users to download plug-ins. By using WebRTC, CSPs may create new web based communications services and extend existing services to web based clients.

A WebRTC application may reach a communications network through a gateway. Such gateway may need protection against security attacks aiming to bypass conventional security devices (e.g., firewalls) and/or disable network servers or services. Examples of these security attacks include sending invalid or poisonous data (e.g., garbage/fuzzing data or content that exploits weaknesses in the system) and denial-of-service ("DoS") or distributed DoS ("DDoS") attacks.

SUMMARY

One embodiment is a system for threat protection of real-time communications ("RTC"). The system receives, by a signaling engine of a gateway, a request of a client according to a protocol, where the request has successfully traversed one or more security devices between the client and the gateway. The system determines, by a protocol handler corresponding to the protocol, whether the request includes a threat. When the request includes the threat, the system indicates the threat to the one or more security devices, and when the request does not include the threat, the system sends the request to an application server at the gateway.

DETAILED DESCRIPTION

Embodiments provide threat protection for Real-Time Communications ("RTC") gateways. In one embodiment, threat protection functionality is provided at the application layer of a WebRTC enabled gateway to detect and log threats that have not been identified through external security devices or other threat protection functionalities implemented at lower layers preceding the gateway. One embodiment coordinates threat metrics across various sources such as multiple protocols, multiple connections, multiple sessions, and/or multiple servers including geographically distributed clusters. One embodiment further integrates the threat protection of the application layer of the gateway with external threat protection systems, and propagates threat detection results of the application layer of the gateway to external threat protection systems. Accordingly, embodiments provide more effective and faster overall threat protection functionality to protect external interfaces of a WebRTC enabled gateway against external threats.

Figure 1:
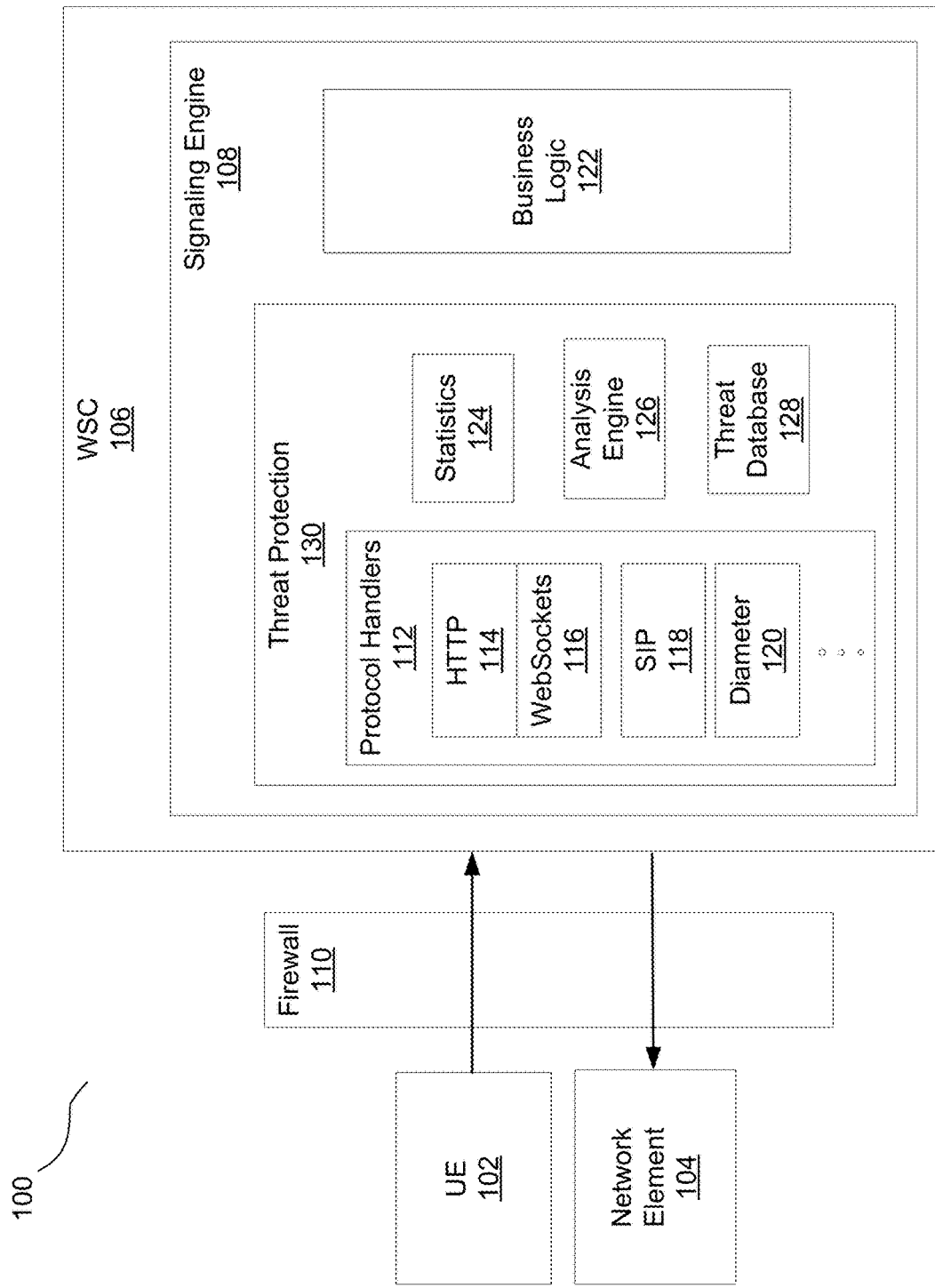
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that executes a WebRTC application in a web browser. WebRTC technology enables RTC in a browser as defined in the Internet Engineering Task Force ("IETF") and World Wide Web Consortium ("W3C") standards. In RTC, users exchange information instantly or with insignificant latency. UE 102 may be any device used by an end user for communications, such as a smartphone, a laptop computer, a tablet, a television, etc.

Network 100 further includes a WebRTC session controller ("WSC") 106 that is a gateway for connecting a web application with a communications network. WSC 106 may connect UE 102 to a session initiation protocol ("SIP") network (e.g., an IP Multimedia Subsystem ("IMS") network). WSC 106 provides interoperability for web-to-web and web-to-network RTC. WSC 106 includes a signaling engine 108 that bridges WebRTC signaling to SIP signaling. Signaling engine 108 allows the clients to locate each other and perform signaling. In one embodiment, in order to initiate RTC between UE 102 and an entity connected to a SIP network, UE 102 establishes a signaling channel with signaling engine 108 over a JavaScript Object Notation ("JSON") protocol for RTC ("JsonRTC"). Then, another signaling channel based on SIP is established between signaling engine 108 and the SIP network.

Signaling engine 108 executes an application including business logic 122 for providing RTC services to UE 102. Business logic 122 (also referred to as application logic or domain logic) is the part of a program that encodes the real-world business rules for handling data, as opposed to the software configured for lower-level details. In one embodiment, the application may be a Java platform, Enterprise Edition ("Java EE") application or a Java 2 platform, EE ("J2EE") application deployed by Oracle Communications Converged Application Server ("OCCAS") from Oracle Corp.

Network 100 further includes a firewall 110 that enforces security policies on the communications of WSC 106. For example, firewall 110 may protect WSC 106 from potentially harmful communications between WSC 106 and UE 102 or between WSC 106 and a network element 104 in a SIP network. In alternative embodiments, network 100 may implement an intrusion detection system ("IDS") different than, or in addition to, firewall 110 to enforce security policies on the communications of WSC 106. In one embodiment, UE 102 may traverse firewall 110 and reach WSC 106 to gain access to network element 104.

Figure 2:
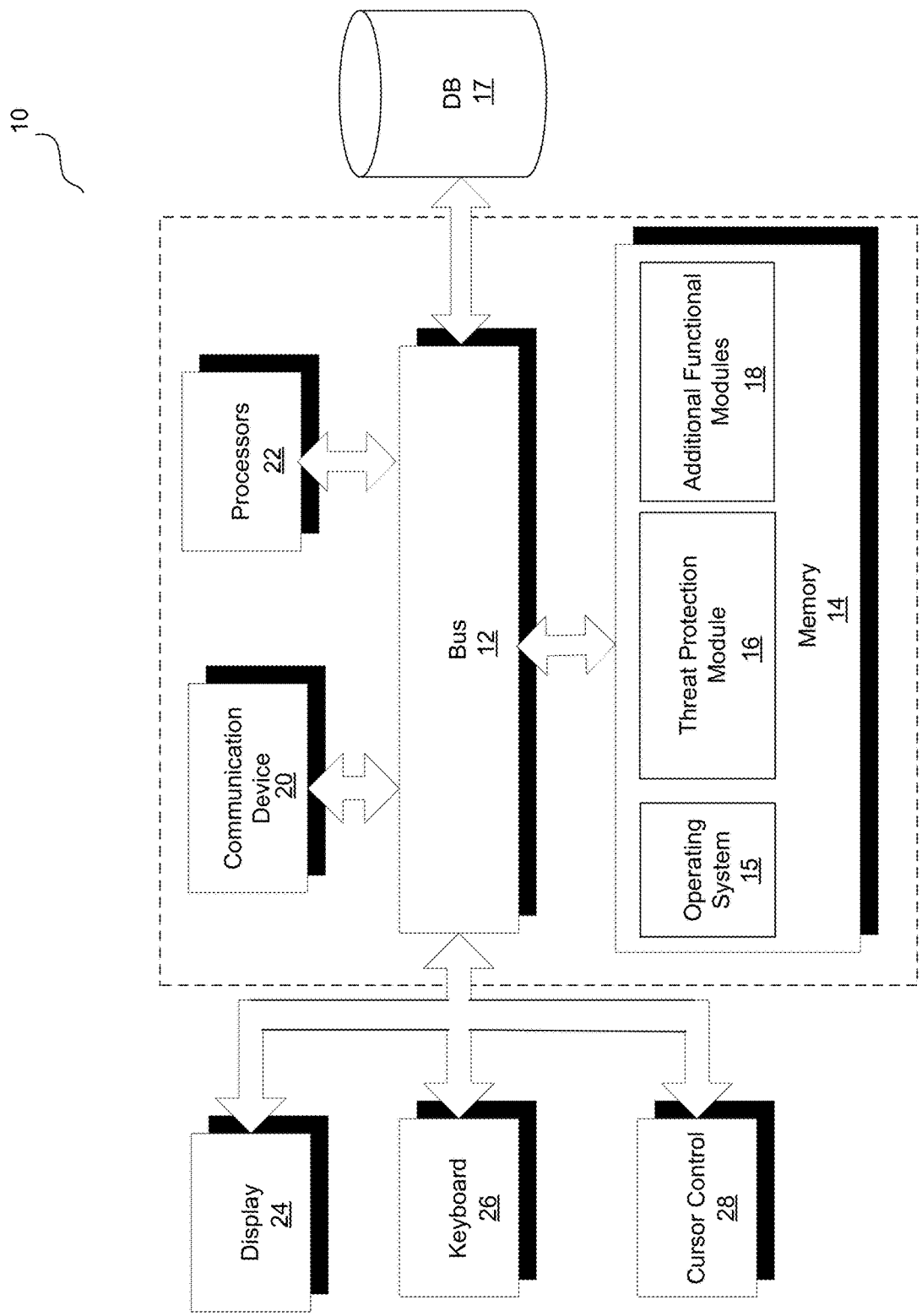
FIG. 2 is a block diagram of a computer server/system in accordance with embodiments of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionalities of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a session controller, system 10 may be a server that in general has no need for a display 24 or one or more other components shown in FIG. 2.

System 10 includes a bus 12 or other communications mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communications device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communications media. Communications media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a threat protection module 16 for providing threat protection, and all other functionality disclosed herein. Accordingly, system 10 may be a specialized computer system that executes threat protection module 16 for providing threat protection, and all other functionality disclosed herein. Alternatively or additionally, system 10 can be part of a larger system, such as added functionality to the "Oracle Communications WebRTC Session Controller" from Oracle Corp. Therefore, system 10 can include one or more additional functional modules 18 to include the additional functionality. A database 17 is coupled to bus 12 to provide centralized storage for threat protection module 16 and additional functional modules 18.

Figure 9:
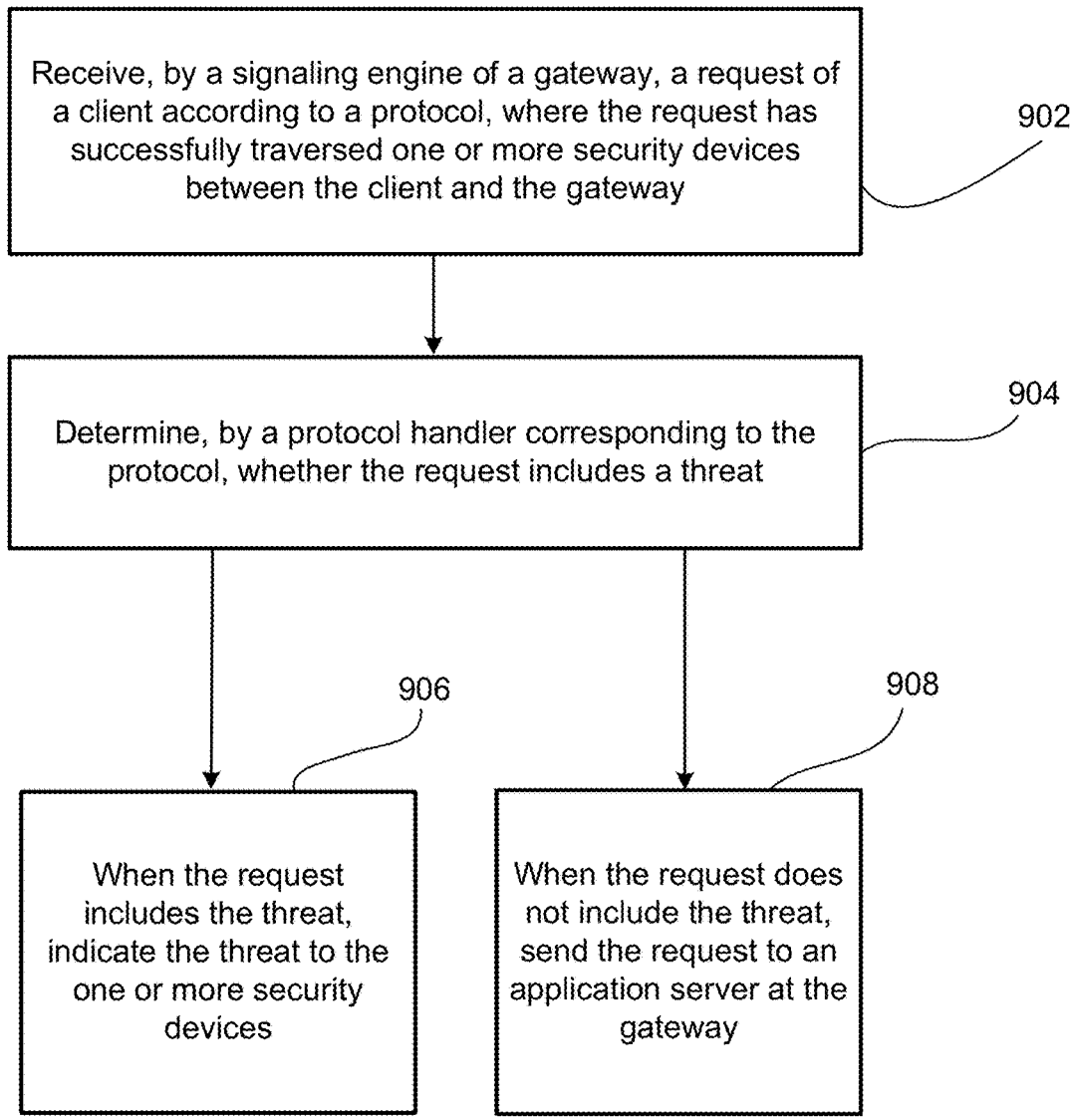
FIG. 9 is a flow diagram of the operation of the threat protection module of FIG. 2 when performing threat protection in accordance with embodiments of the present invention.

In one embodiment, threat protection module 16 and/or additional functional modules 18 include a receiving module that receives, by a signaling engine of a gateway, a request of a client according to a protocol, where the request has successfully traversed one or more security devices between the client and the gateway; a determining module that determines, by a protocol handler corresponding to the protocol, whether the request includes a threat; an indicating module that, when the request includes the threat, indicates the threat to the one or more security devices; and a sending module that, when the request does not include the threat, sends the request to an application server at the gateway, as will be described herein with reference to FIG. 9.

Referring again to FIG. 1, with known systems, it may be necessary to provide threat protection for WSC 106. For example, WSC 106 may need protection against invalid and/or poisonous data (e.g., garbage/fuzzing data, or content that exploits weaknesses in the system) sent from an external network and aiming to bypass security or disable network servers or services. WSC 106 may also need to be protected against denial-of-service ("DoS") or distributed DoS ("DDoS") attacks. A DoS attack overloads a resource to make it unavailable to legitimate users. Poisoning attacks generally refer to attacks where the lookup table of a system is changed by including incorrect/null values.

One known solution for protecting WSC 106 is to use an external firewall (e.g., firewall 110) or implement an internal firewall as ad-hoc logic within the application that needs to be protected (e.g., business logic 122). Firewalls are effective in blocking threats on lower level protocols, such as IP, transmission control protocol ("TCP" as described in, for example, IETF request for comments ("RFC") 793 and RFC 675), transport layer security ("TLS"), hypertext transfer protocol ("HTTP"), etc. TLS is a cryptographic protocol as provided in, for example, IETF RFC 2246, RFC 4346, RFC 5246, and/or RFC 6176.

Lower levels of the stack are also usually protected by external load balancers such as the load traffic manager ("LTM") by F5 Networks, Inc. F5 is a company that provides network management solutions such as load balancing, firewall, and security related network features. These functions are deployed as modules on a common platform called BIG-IP. The modules that are applicable to WSC 106 are a local traffic manager, an advanced firewall manager, and an application security manager. The local traffic manager provides load balancing, offloading (e.g., secure sockets layer ("SSL") termination), and rate limits. The advanced firewall manager provides general firewall and threat protection. The application security manager provides threat protection on an application level, such as extensible markup language ("XML") injection, cross-site request forgery ("CSRF"), login, etc. Lower levels of the stack may also be protected by hardening of the operating system ("OS"). Hardening an OS refers to improving its security by reducing the number of different points of the OS which could be used by an attacker (referred to as the surface of vulnerability). Examples of low level threats include Internet control message protocol ("ICMP") floods and SYN floods.

One disadvantage with these known approaches is that although firewalls can be programmed to handle advanced flows, such programming requires a deep understanding of the protocol that is to be protected, but a firewall does not generally understand higher level application protocols that tend to get proprietary. Further, most communications systems are real-time and require immediate response to threats, but traditional log mining IDSs are too slow. Also, known solutions require all traffic that is to be correlated for threat detection to traverse a single box where all messages are intercepted. This is not possible in a large scale multi-protocol and/or distributed system.

In contrast to the known solutions, one embodiment of the present invention secures WSC 106 at the application layer of the protocol stack. In one embodiment, a threat protection 130 at signaling engine 108 provides threat protection functionality for WSC 106 to detect, block, and log threats, and dynamically create rules based on traffic history to block traffic according to configured policies. In the embodiment of FIG. 1, threat protection 130 is implemented within signaling engine 108 of WSC 106. However, in alternative embodiments, threat protection 130 may be implemented separate from and independent of signaling engine 108 and/or WSC 106.

In one embodiment a signaling engine of a gateway receives a request of a client according to a protocol, where the request has successfully traversed one or more security devices between the client and the gateway. Then, the request is validated and based on correlating the request with historical system data and configured threat policies/rules, it is determined whether the request should be considered a threat. When a threat is detected on a specific request or at another point in time (e.g., during background system analysis), appropriate actions are taken to protect the system from abuse and allowing it to continue to serve legitimate requests. Accordingly, this embodiment can correlate information from multiple protocols and sessions to take the aforementioned decision based on very rich context information, where such correlating may be difficult to perform in an individual system. Further, this embodiment can store key indicators of its usage patterns in a structured manner, and then use that to make intelligent and complex threat detection decisions in real-time.

Embodiments work together with, and in addition to firewalls, to enhance the protection of WSC 106 by detecting and blocking threats as soon as possible and reducing the risk of system downtime or security breaches. Embodiments can be integrated and re-used inside applications that expose web-based protocols in order to leverage state and configuration of such applications. Embodiments can also be integrated and re-used inside non-web based protocols such as SIP, diameter, etc.

In one embodiment, threat protection 130 includes statistics 124 that provides functionality for tracking threat protection metrics and associated data such as IPs and user. In one embodiment, threat protection metrics may include one or more of the number of concurrent sessions, the number of bad requests, the number of sessions created within a time interval, the number of messages received per second, etc. Statistics 124 is a subsystem that has a built-in automatic roll-up stored in a coherence cache. A coherence cache includes data objects that are used at an intermediate stage between a database and its client applications, as provided in, for example, the Oracle Coherence solution from Oracle Corp.

Threat protection 130 also includes an analysis engine 126 that continuously executes rules against statistics 124 to determine bad behavior. In one embodiment, analysis engine 126 makes threat protection decisions based on statistics 124, including information on history, state, or users of business logic 122. Such information is logged and managed by statistics 124 and is not generally known to firewall 110. In one embodiment, based on information in statistics 124, analysis engine 126 correlates threats related to one or a combination of multiple protocols, multiple communications from multiple IP addresses, multiple servers, etc., and identifies threats accordingly.

Threat protection 130 further includes a number of protocol handlers 112 for each protocol supported by WSC 106, such as HTTP 114, WebSockets 116 (protocols providing a full duplex communications channel over a TCP connection), SIP 118, diameter 120, etc. Each protocol handler consults a threat database 128 on every request. Threat database 128 includes a size limited list of current threats replicated on every node for performance. Protocol handlers 112 are configured to take action on a detected threat, either by generally denying the operation or by returning a specific error code that an external firewall (e.g., firewall 110) can use to improve threat protection. For example, protocol handlers 112 may return a specific error code that an F5 BIG-IP LTM can use to improve its denial strategy in response to a DDoS attack.

In one embodiment, the metrics configured for protocol handlers 112 may be provided by one or more of an application server, a protocol stack (e.g., the SIP stack in OCCAS), and an application logic. In one embodiment, an application server may provide metrics configured for protocol handlers 112 such as the number of concurrent sessions for a named user. Also, a protocol stack may provide metrics configured for protocol handlers 112 such as statistics on the number of different types of requests sent, types of services requested, etc. For example, based on SIP requests and responses as provided in IETF RFC 3261, the protocol stack may provide statistics that indicate how many devices a user has used to send the REGISTER message from, how many calls (i.e., INVITE messages) the user has sent, etc. An application logic may have a different set of good/bad behavior and statistics to provide as metrics configured for protocol handlers 112. For example, one application may only allow a user to make a certain number of calls per day, and any other behavior may be considered a breach. In one example, protocol handlers 112 may deny requests from a user that places more than 10 calls per second, but the application logic may count other statistics that lead to the user being blocked earlier.

In one embodiment, the application server may be the WebLogic application server from Oracle Corp., which is a server for building and deploying enterprise Java EE applications. One embodiment protects WSC 106 at web-based protocols (e.g., HTTP, WebSockets, etc.) when a web browser communicates with a web server. In one embodiment, protocol handlers 112 provide threat protection for the JsonRTC protocol and for HTTP-based authentication using typical web authentication technologies such as OAuth, basic access authentication (or basic authentication), form based authentication (or form authentication), mutual authentication, etc.

In one embodiment, business logic 122 includes custom logic for detection of bad behavior, and reports this to threat database 128. For example, business logic 122 may implement a JSON parsing logic to detect values out of specific ranges, and report these as suspicious activity to threat database 128. Threat database 128 can have varying granularity depending upon requirements of business logic 122, and each threat can be associated with any combination of users, IP addresses, applications, protocols, or resource types. In one embodiment, WSC 106 may host several HyperText Markup Language 5 ("HTML5") applications using the WebRTC technology. By cross-referencing various information in statistics 124 with the origin-host information in a WebSocket request, embodiments can detect misbehaving users as well as misbehaving applications. One embodiment performs correlation across various protocols such as WebSocket, SIP, HTTP, etc. Alternatively or additionally, one embodiment performs correlation across various sessions since a single abusive user may have several WebSocket connections to several hosts or geographically distributed clusters.

In one embodiment, business logic 122 dynamically changes and influences the rules for threat detection to match the behavior that it expects. For example, WSC 106 may implement a customizable Groovy code to define custom metrics and the manipulations of threat rules. Groovy is a programming language configured for object-oriented programming in JAVA environments. It allows access to the syntax tree during the compiling process before machine code has been generated.

One embodiment protects external interfaces of WSC 106 (e.g., HTTP and WebSockets) from external threats such as invalid or poisonous content, security attacks, and DoS attacks. Invalid or poisonous content may include garbage/fuzzing data or content that will exploit weaknesses in the system. Security attacks may include attempts to bypass security, hacking passwords, or other ways to find security holes. DoS attacks may include flooding the system with valid or invalid requests. Tables 1-3 below provide examples of invalid/poisonous JsonRTC content, security attacks, and DoS attacks, respectively.

TABLE 1

Examples of invalid or poisonous JSON RTC content

| Scenario | Description |
| --- | --- |
| JsonRTC large message | Size of the JSON message or its internal structure (size of elements and nesting depth) is too large |
| JsonRTC bad message | Bad JsonRTC message, e.g., it is not a JSON document, does not have mandatory fields, or parameter values are invalid |
| JsonRTC inactivity | Inactivity on JsonRTC session, e.g., no ping/pong or other messages, client connects TCP socket but does not send anymessage, etc. |
| JsonRTC timeout | Timeout in receiving JSON messages, i.e., client does not respond properly to requests from WSC |
| JsonRTC rejected | Properly formatted JsonRTC is rejected, e.g., not allowed, invalid sequence, no matching criteria, wrong initiator, etc. |
| Connection abort | WebSocket connection is closed abnormally |

TABLE 2

Example security attacks

| Scenario | Description |
| --- | --- |
| Login fail | Login towards WSC fails, e.g., invalid credentials |
| Unauthorized | Attempt to access resource that is not allowed, e.g., invalid uniform resource identifier ("URI")/App, accessing package that is not allowed, cross-origin resource sharing ("CORS" as provided by the W3C standard) issue, etc. |

TABLE 3

Example DoS attacks

| Scenario | Description |
| --- | --- |
| Repeated violation | Repeated violation of any other rule |
| Login flood | Login attempt rate exceeding threshold |
| WebSocket create flood | WebSocket create rate exceeding threshold |

TABLE 3-continued

Example DoS attacks

| Scenario | Description |
| --- | --- |
| JSON request flood | Request rate exceeding threshold. Limit should enforce request rate (number of requests/time), but could also consider data rate (number of bytes/time). |
| Subsession create flood | Subsession create rate exceeding threshold |

Figure 3:
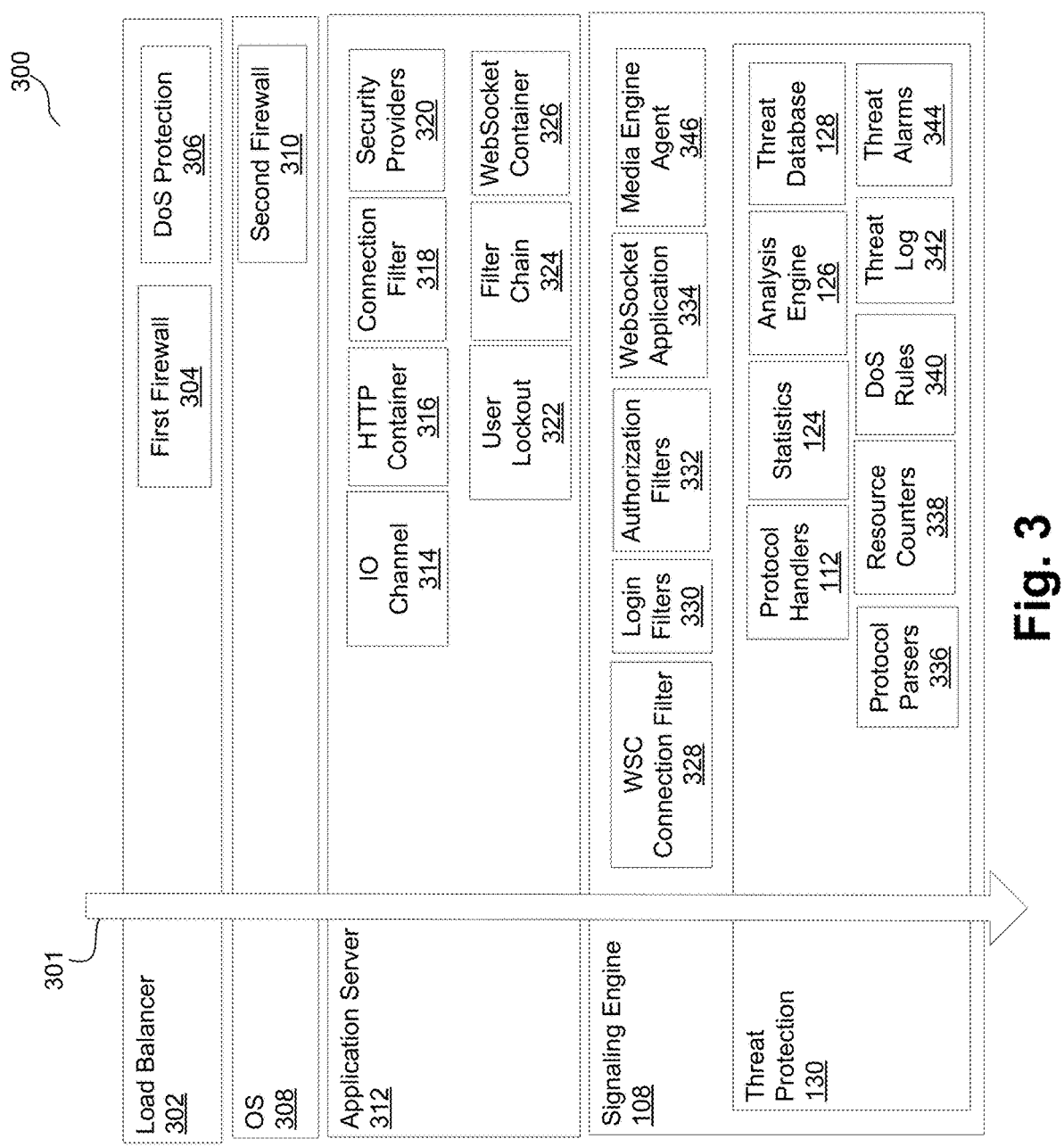
FIG. 3 is a block diagram of an example system for threat protection in accordance with embodiments of the present invention.

FIG. 3 is an example system 300 for threat protection of WSC 106 in accordance with some embodiments. System 300 includes network elements such as signaling engine 108, threat protection 130, protocol handlers 112, statistics 124, analysis engine 126, and threat database 128, as described herein with reference to FIG. 1. System 300 provides layers of an application server stack corresponding to an application server 312, and layers of a WSC signaling engine stack corresponding to signaling engine 108. These layers are configured for threat protection and several layers may redundantly provide the same threat protection enforcement so that a threat is blocked as soon as possible. In one embodiment, application server 312 may be a WebLogic server (a Java enterprise edition application server from Oracle Corp.) with a deployed WSE signaling engine application (e.g., business logic 122 in FIG. 1) which may have a distributed/clustered topology.

In system 300, at the outermost layer, a fronting load balancer 302 (which may be the BIG-IP LTM by F5) receives an external request 301. Load balancer 302 includes a first firewall 304 and a DoS protection 306 that inspect external request 301 for potential threats. If external request 301 passes through load balancer 302, it reaches an OS 308 that includes a second firewall 310 which again inspects external request 301 for potential threats. OS 308 may be a hardened Linux OS with restrictive firewall and network settings that provide threat protection functionality on a per node basis.

Then, external request 301 reaches application server 312. Application server 312 may have a distributed topology running across multiple geographical locations. Application server 312 provides threat protection by implementing a number of functionalities, including an input/output ("IO") channel 314, an HTTP container 316, an optional connection filter 318, security providers 320, a user lockout 322, a filter chain 324, and a WebSocket container 326. IO channel 314 provides an entry point that manages TCP connections. A server typically always has one main port (e.g., with a default value of 7001) that can multiplex all protocols, but individual channels can also be configured independently. In one embodiment, IO channel 314 provides a dedicated network channel for all WebSocket communications of WSC 106. HTTP container 316 is a component of a webserver that manages HTTP based requests and implements corresponding threat protection functionality. In one embodiment, HTTP container 316 parses the requests, associates corresponding session information with the requests, builds responses (e.g., static/dynamic) as per the application logic, etc. Connection filter 318 is an optional filter that can be configured to reject any TCP connections before they are accepted, so that application server 312 can intercept TCP connections and examine them for threat protection.

Security providers 320 consult individual security plugins to authenticate external request 301. User lockout 322 determines consecutive failed login attempts (e.g., with a default value of 5) and triggers lockout of a user (e.g., for a default period of 30 minutes). In one embodiment, user lockout functionality does not apply to OAuth where authentication is handled by an external OAuth server that also handles user lockouts.

Filter chain 324 filters HTTP requests before they reach application logic. In one embodiment where application server 312 has several applications/sessions running, filter chain 324 gets a raw HTTP requests before it is associated with a particular application or session of application server 312. In one embodiment, the filtering performed by filter chain 324 is a cross-cutting logic which validates headers, authentication, tokens, etc. Filter chain 324 may include several filters that are chained together and are executed consecutively upon a successful execution of a previous filter in the chain. For WebSockets, filter chain 324 intercepts the initial HTTP upgrade request, and the first filter in filter chain 324 is called once a user is successfully authenticated. In one embodiment, when an HTTP connection has been authenticated and upgraded to a WebSocket, WebSocket container 326 handles all communications with the socket and the corresponding application.

After application server 312, external request 301 reaches signaling engine 108 which provides threat protection by implementing a number of functionalities, including a WSC connection filter 328, login filters 330, authorization filters 332, a WebSocket application 334, a media engine agent 346, protocol handlers 112, statistics 124, analysis engine 126, threat database 128, protocol parsers 336, resource counters 338, DoS rules 340, a threat log 342, and threat alarms 344.

WSC Connection filter 328 is a class that implements connection filter 318 at application server 312 to block blacklisted IP addresses. Login filters 330 include a standard HTTP servlet filter that is part of filter chain 324 of application server 312 for login requests (e.g., URI/login). Authorization filters 332 include a standard servlet filter for WebSocket upgrade requests (e.g., URI /ws/*). WebSocket application 334 handles individual messages over the WebSocket protocol when a WebSocket connection is accepted. WebSocket application 334 can reject or tear down the WebSocket connection at any point in time.

Protocol parsers 336 include a JsonRTC parser that parses each JSON message and determines if it is a well formed message before forwarding it to any other functionality. Resource counters 338 track resource usage and enforce threshold limits (e.g., maximum number of sessions or subsessions allowed). Threat database 128, as also described herein with reference to FIG. 1, collects threat events and evaluates them based on configured thresholds and known history. Threats that exceed the threshold trigger creation of DoS rules 340. History in threat database 128 automatically expires over time. Each threat event that is registered with threat database 128 includes the type of the threat (e.g., JsonRTC1, DoS3, etc.), a time stamp, and a source (e.g., information available about the threat, such as source IP, user, application, origin, etc.).

DoS rules 340 are a set of rules (e.g., blacklists) that are cross checked to block DoS attacks. Such rules automatically expire over time. Threat log 342 includes log files where threat related log messages are recorded. Threat log 342 includes information on when threats are detected, and when DoS rules 340 are created and will expire. Threat alarms 344 are alarms that are generated for threat related log events and may partially correlate with threat log 342. Threat alarms 344 can be consumed as Java management extensions ("JMX") notifications or simple network management protocol ("SNMP") traps.

Media engine agent 346 is an agent that interacts with a media engine of WSC 106. Media engine agent 346 may be extended to receive events from the media engine of WSC 106 regarding media related threats (e.g., if bandwidth has exceeded a bandwidth threshold).

Table 4 below provides example threat types and corresponding threat detection points ("TDPs") according to some embodiments. A TDP is where a threat is detected and blocked. Each TDP that is implemented in WSC 106 is also integrated with threat database 128.

TABLE 4

Example threat types and corresponding TDPs

| Scenario | TDP | Notes |
|---|---|---|
| JsonRTC large message | WebLogic and WSC | WebLogic WebSocket stack includes message size limitations that are configurable. WSC has logic to block very large JSON numbers. |
| JsonRTC bad message | WSC | Based on JSON library and JSON parser |
| JsonRTC inactivity | WebLogic | WebSocket inactivity is enforced by WebLogic based on configuration. |
| JsonRTC timeout | WebLogic | Enforced by WSC |
| JsonRTC rejected | WSC | Enforced by WSC |
| Connection abort | WebLogic | WebLogic gives notification to the WSC application when connection is closed and what the corresponding cause is. |
| Login fail | WebLogic and Security Provider | Default value of 5 fails cause user lockout. Enforcement per user is not possible for OAuth flows since WSC can only know the user identifier ("ID") if the flow succeeds. |
| Unauthorized | WSC | Enforced by WSC |
| Repeated violation | WebLogic and WSC | WebLogic handles login fail. WSC handles other threads using threat database and DoS rules. |
| Login flood | Load Balancer | Can be provided by F5. |
| WebSocket create flood | Load Balancer | Can be handled in the same way as login flood. |
| JSON request flood | WSC | Corresponding configuration can be provided at resource counters |
| Subsessions create flood | WSC | Corresponding configuration can be provided at resource counters |

In one embodiment, threat database 128 associates a threat severity to each threat type. Threat severity is a non-negative integer that indicates the severity or the weight of a threat (e.g., 0, 3, 42, etc., with a default value of 1). Threat type indicates the type of a threat as provided, for example, in Tables 1-4 (e.g., "JsonRTC bad message"). In one embodiment, DoS rules 340 provide a DoS configuration as well as DoS thresholds. The DoS configuration includes HTTP status codes, a DoS threshold interval, and a DoS block duration. An HTTP status code is the status code returned to the client when requests are rejected by WSC filters (e.g., with a default value of "403" indicating "Forbidden"). The DoS threshold interval is an integer that defines the time interval to keep events in threat database 128 (e.g., with a default value of 10 minutes). The DoS block duration is the time that the blocking of a source is enforced (e.g., with a default duration of 10 minutes).

Table 5 below provides an example DoS threshold configuration according to some embodiments.

TABLE 5

An example DoS threshold configuration

| Source | Threshold | Action |
|---|---|---|
| User | 5 | Block |
| Application | 100 | Alert |
| Application | 200 | Block |

In this configuration, WSC 106 is able to detect and block threat sources including "users" (the name of the authenticated user, also known as web identity) and "applications" (determined based on the URI of the request). In this configuration, 5 attacks from the same user (e.g., within 10 minutes and adjusted for severity) will cause the IP and/or the user to be blocked. 100 attacks from the same application will trigger an alert (e.g., a log message and an alarm). 200 attacks from the same application will cause the application to be blocked.

One embodiment provides runtime managed beans ("MBean") for threat protection within threat database 128. An Mbean is an object that represents resources. In one embodiment, a runtime MBean "ThreatRuntimeMBean" with object name:

oracle.wsc:Type=ThreatRuntimeMBean,Location= [ServerName]

is provided that can view blocked sources and manually block or unblock them.

One embodiment provides threat protection by integrating WSC 106 with external systems (e.g., load balancers, firewalls, etc.) through integration points such as threat logs, alarms, and HTTP status codes. In one embodiment, for integration through threat log 342, an external system can parse threat log 342 to detect when WSC 106 has identified and blocked threats. Accordingly, the external system may also define corresponding rules in its firewall and block requests earlier and more efficiently. In one embodiment, for integration through alarms, an external system can listen for alarms (e.g., JMX notifications or SNMP traps) to detect when WSC 106 has identified and blocked threats. Accordingly, the external system may also define corresponding rules in its firewall.

In one embodiment, for integration through HTTP status codes, these codes may be configured so that an external system may detect specific codes to set up corresponding rules in its firewall. For example, when HTTP requests fail due to threat detection, the returned HTTP status code is configurable and may be configured to indicate to an external system that a threat has been detected. Such status codes are applicable to HTTP based authentications and WebSocket upgrades.

FIGS. 4-8 are example message sequence flows for threat protection according to some embodiments. FIGS. 4-8 include network elements such as UE 102, application server 312, WSC connection filter 328, security providers 320, filter chain 324, login filters 330, authorization filters 332, WebSocket container 326, business logic 122, firewall 110, protocol handlers 112, statistics 124, analysis engine 126, and threat database 128, as described herein with reference to FIGS. 1 and 3.

Figure 4:
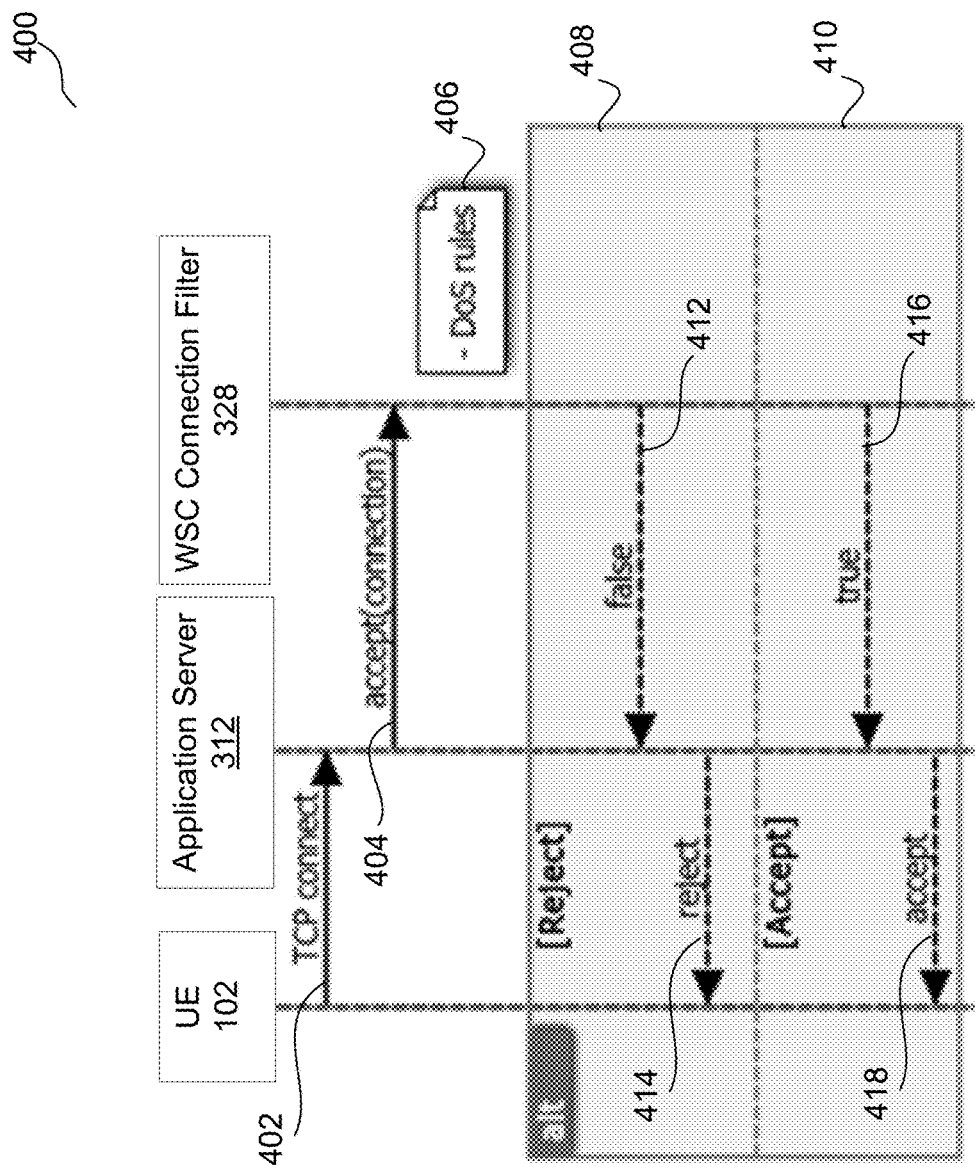
FIGS. 4-8 are example message sequence diagrams for threat protection in accordance with embodiments of the present invention.

FIG. 4 is an example "TCP connect" flow 400 according to some embodiments. At 402 UE 102 sends a TCP connect request to application server 312. At 404 application server 312 sends a message to WSC connection filter 328 to perform threat protection and accept connection. At 406 WSC connection filter 328 examines the connection request against DoS rules, resulting, alternatively, in the request being rejected at 408 or being accepted at 410. In rejecting the request, at 412 WSC connection filter 328 sends a "false" message to application server 312, and at 414 application server 312 sends a "reject" message to UE 102. In accepting the request, at 416 WSC connection filter 328 sends a "true" message to application server 312, and at 418 application server 312 sends an "accept" message to UE 102.

Figure 5:
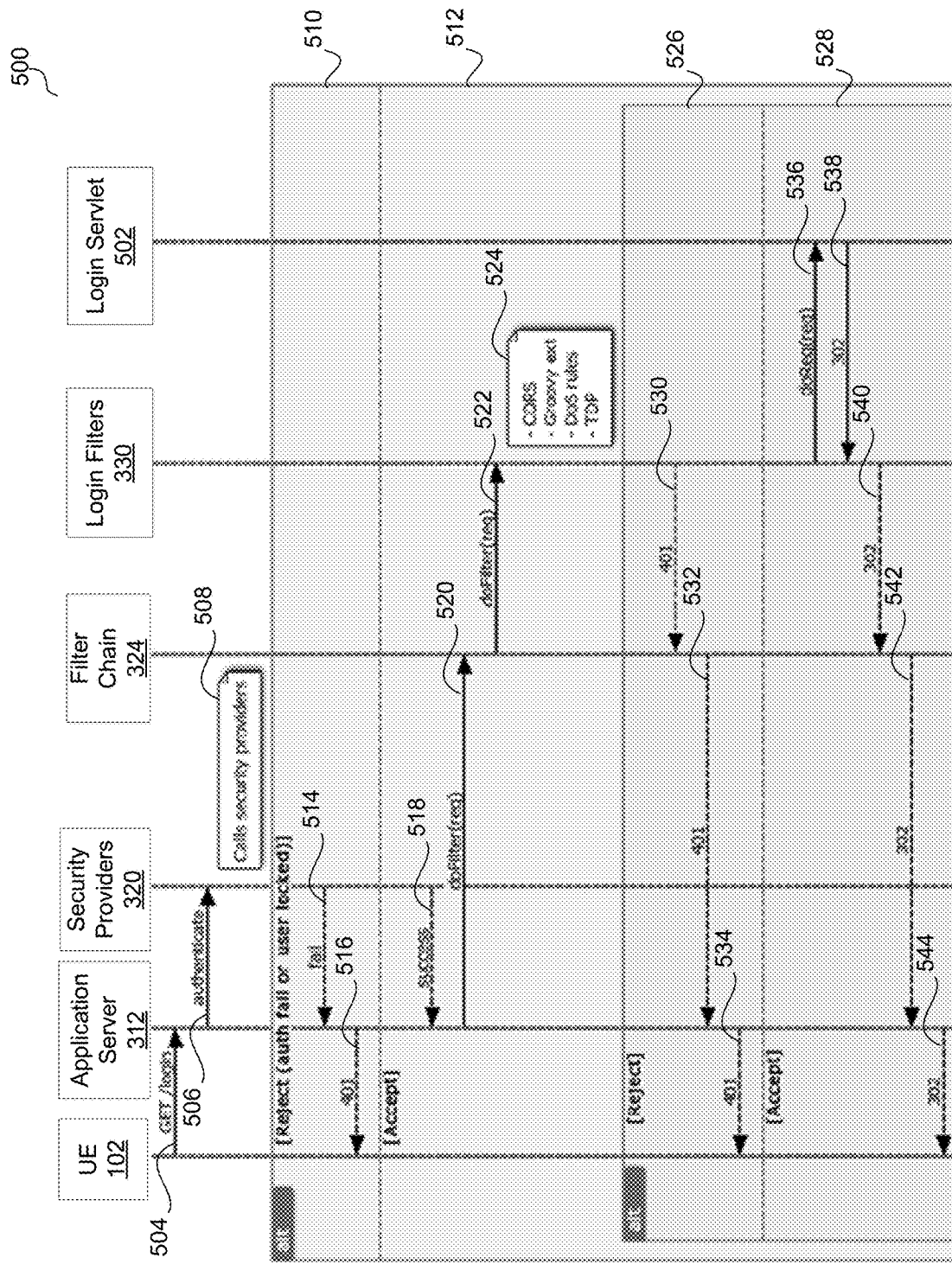

FIG. 5 is an example "HTTP login" flow 500 according to some embodiments. At 504 UE 102 sends a "GET/login" request to application server 312 corresponding to an HTTP login. At 506 application server 312 sends an authentication request message to security providers 320 to authenticate UE 102. At 508 security providers 320 call one or more security plugins to authenticate UE 102, resulting, alternatively, in the authentication being unsuccessful at 510 or being successful at 512. When the authentication is unsuccessful, at 514 security providers 320 send a "fail" message to application server 312, and at 516 application server 312 sends a "401" message to UE 102. When the authentication is successful, at 518 security providers 320 send a "success" message to application server 312, and at 520 application server 312 sends a "doFilter" message to filter chain 324 including the login request of UE 102.

At 522 filter chain 324 sends a "doFilter" message to login filters 330. At 524 login filters 330 examine the request based on CORS, Groovy extensions, DoS rules, and TDPs, resulting, alternatively, in the request being rejected at 526 or being accepted at 528. In one embodiment, CORS and/or Groovy extensions can add/edit DoS rules in WSC 106 which can be subsequently used by any threat protection functionality such as TDPs or filter chain 324.

When the request is rejected, at 530 login filters 330 send a "401" message to filter chain 324, at 532 filter chain 324 sends a "401" message to application server 312, and at 534 application server 312 sends a "401" message to UE 102. When the request is accepted, at 536 login filters 330 sends a "doReg" message to a login servlet 502 including the request of UE 102 to register. At 538 login servlet 502 registers UE 102 and sends a "302" message to login filters 330. At 540 login filters 330 send a "302" message to filter chain 324, at 542 filter chain 324 sends a "302" message to application server 312, and at 544 application server 312 sends a "302" message to UE 102.

Figure 6:
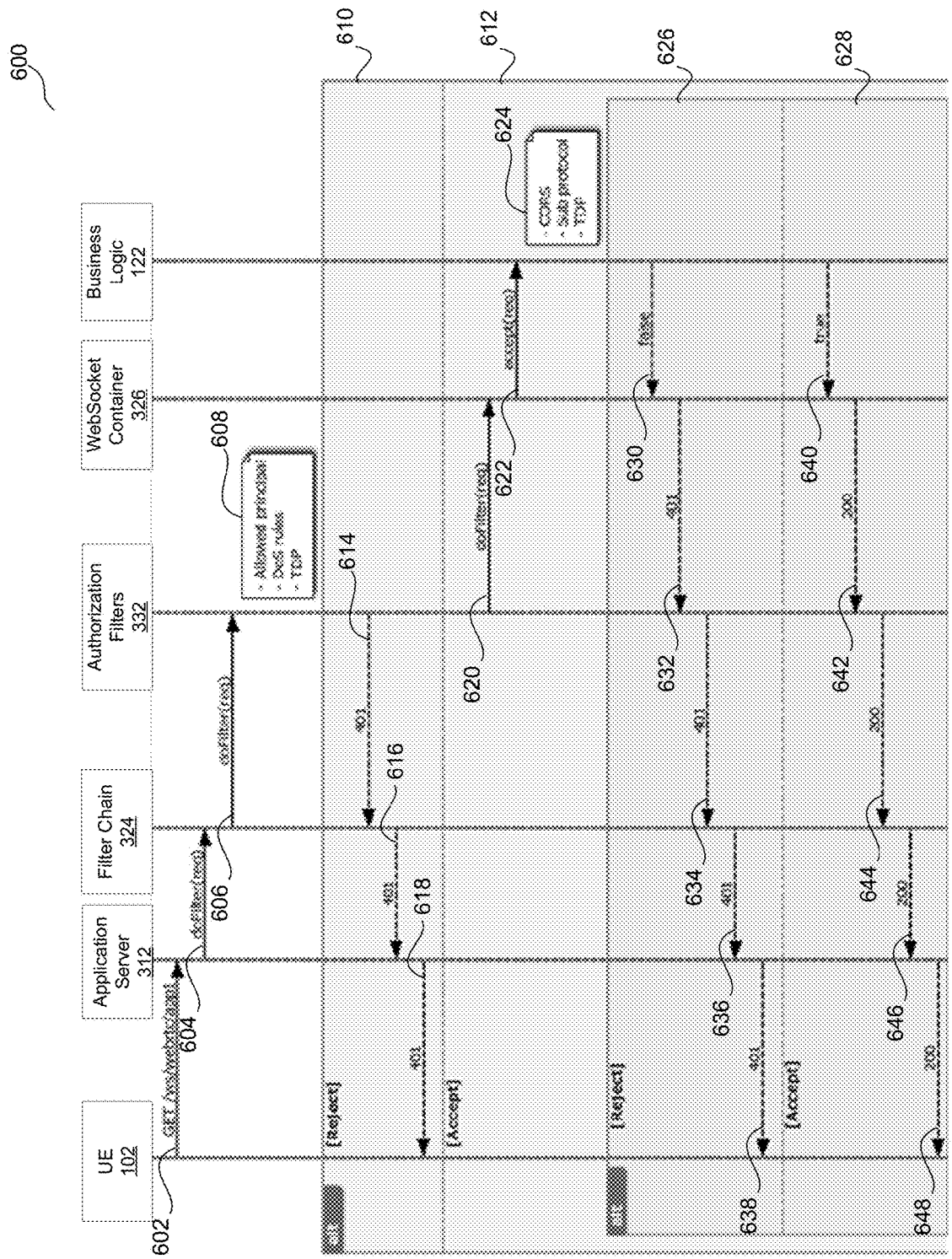

FIG. 6 is an example "WebSocket upgrade" flow 600 according to some embodiments. At 602, UE 102 sends a "GET/ws/webrtc/app1" request to application server 312 to request an HTTP connection to be upgraded to a WebSocket. At 604, application server 312 sends "doFilter" message to filter chain 324 including the request of UE 102. At 606 filter chain 324 sends a "doFilter" message to authorization filters 332 including the request of UE 102. At 608 authorization filters 332 examine the request of UE 102 based on allowed principals, DoS rules, and TDPs, resulting, alternatively, in the request being rejected at 610 or accepted at 612.

When the request is rejected, at 614 authorization filters 332 send a "401" message to filter chain 324, at 616 filter chain 324 sends a "401" message to application server 312, and at 618 application server 312 sends a "401" message to UE 102. When the request is accepted, at 620 authorization filters 332 send a "doFilter" message to WebSocket container 326 including the request of UE 102. At 622 WebSocket container 326 sends an "accept" message to business logic 122 including the request of UE 102.

At 624 business logic 122 examines the request based on CORS, sub-protocols, and TDPs, resulting, alternatively, in the request being rejected at 626 or being accepted at 628.

When the request is rejected, at 630 business logic 122 sends a "false" message to WebSocket containers 326, at 632 WebSocket containers 326 send a "401" message to authorization filters 332, at 634 authorization filters 332 send a "401" message to filter chain 324, at 636 filter chain 324 sends a "401" message to application server 312, and at 638 application server 312 sends a "401" message to UE 102. When the request is accepted, at 640 business logic 122 sends a "true" message to WebSocket containers 326, at 642 WebSocket containers 326 send a "200" message to authorization filters 332, at 644 authorization filters 332 send a "200" message to filter chain 324, at 646 filter chain 324 sends a "200" message to application server 312, and at 648 application server 312 sends a "200" message to UE 102.

Figure 7:
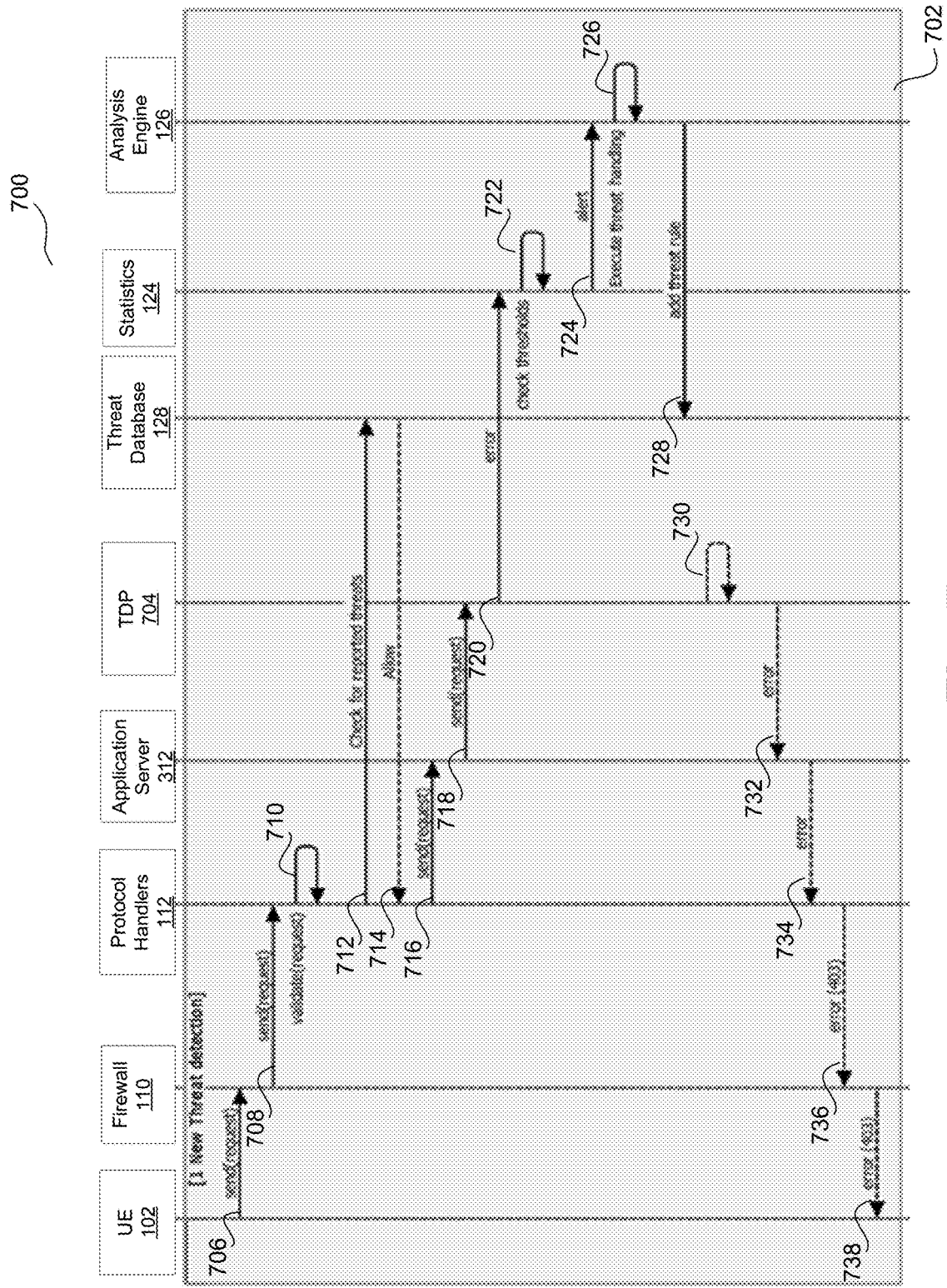
Figure 8:
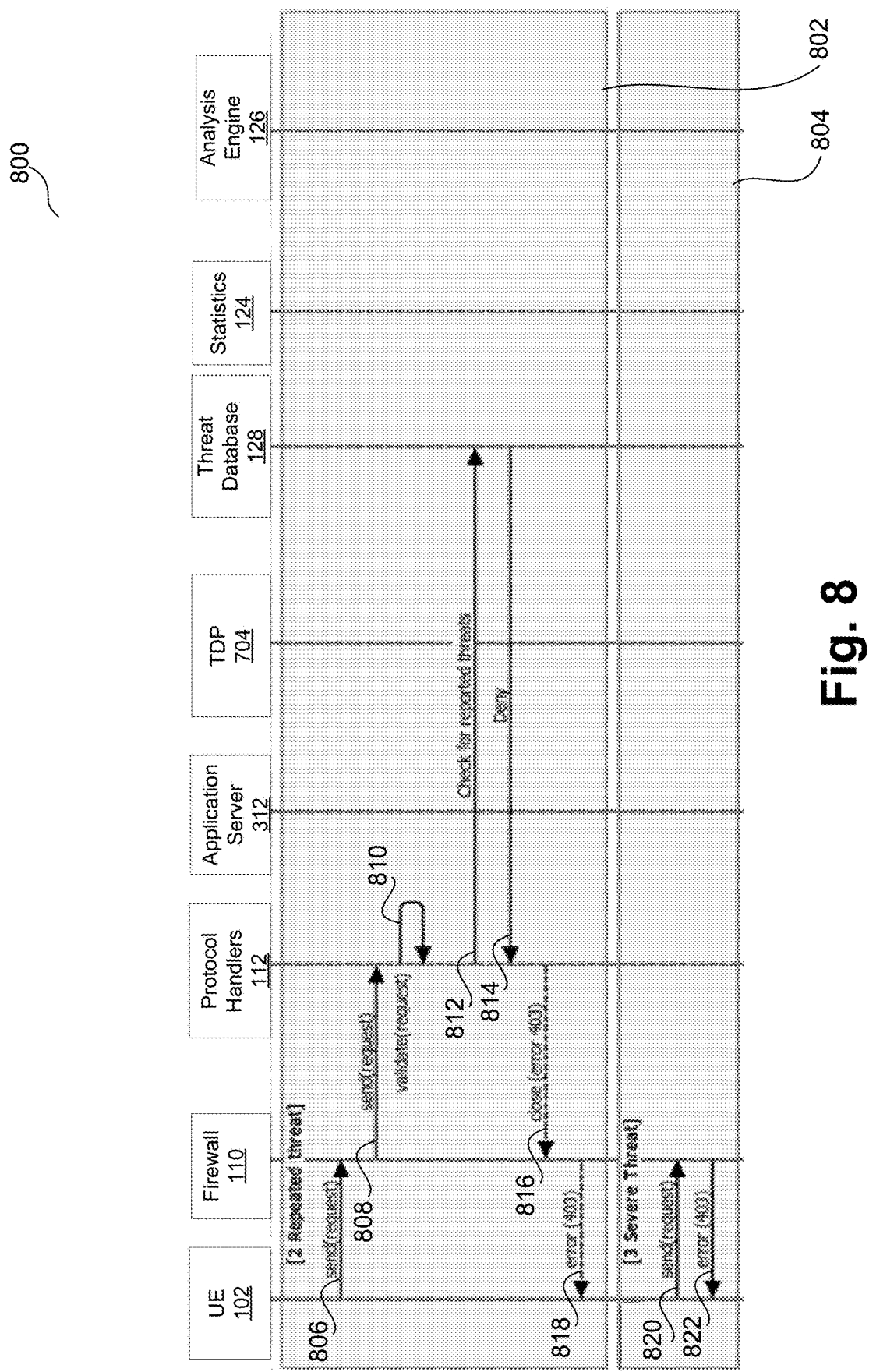

FIGS. 7 and 8 are example "threat detection" flows 700, 800, according to some embodiments. FIG. 7 provides an example flow for a new threat detection 702, while FIG. 8 provides example flows for a repeated threat 802 and a severe threat 804. For new threat detection 702, at 706 UE 102 sends a request to firewall 110, and at 708 firewall 110 forwards the request to protocol handlers 112. At 710 protocol handlers 112 validate the request by determining if the message a remote end point (e.g., another server/user) has sent is valid and conforms to corresponding protocol specification. For example, protocol handlers 112 may validate a SIP message based on the message format and valid values provided in IETF RFC 3261. In one embodiment where IETF RFCs do not cover all message formats and values that are considered valid, custom validations are implemented by protocol handlers 112 to ensure that a valid received message can proceed and is processed further.

At 712 protocol handlers 112 determine if the request corresponds to a reported threat by reaching threat database 128, and at 714 threat database 128 allows the request since the threat is a new threat that has not yet been reported.

At 716 protocol handlers 112 send the request to application server 312, and at 718 application server 312 sends the request to a TDP 704. At 720 TDP 704 detects a threat and indicates an error to statistics 124. At 722 statistics checks configured thresholds corresponding to the request. At 724 statistics indicates an alert to analysis engine 126, and at 726 analysis engine 126 executes a corresponding threat handling. In one embodiment, such threat handling may include different functionalities at different levels of FIG. 3. For example, security providers 320 may reject a request as unauthorized, while threat protection 130 may choose to remain silent (so that the remote endpoint thinks the server is unresponsive) or send a message indicating the reason why this server decided to not honor a malicious behavior of a user. At 728 analysis engine 126 adds a threat rule to threat database 128 corresponding to the newly detected threat.

In one embodiment, when at 720 TDP 704 detects a threat and indicates an error to statistics 124, it also throws an exception at 730, and sends an "error" message to application server 312 at 732. Exceptions are functionalities used by Java programming language to handle exceptional events such as errors. At 734 application server 312 sends an "error" message to protocol handlers 112, at 736 protocol handlers 112 send an "error(403)" message to firewall 110, and at 738 firewall 110 sends an "error(403)" message to UE 102.

For repeated threat 802, at 806 UE 102 sends a request to firewall 110, and at 808 firewall 110 forwards the request to protocol handlers 112. At 810 protocol handlers validate the request. At 812 protocol handlers determine if the request corresponds to a reported threat by reaching threat database 128, and at 814 threat database 128 denies the request since the threat has been previously reported and is a repeated threat. At 816 protocol handlers 112 send an "error(403)" message to firewall 110, and at 818 firewall 110 sends an "error(403)" message to UE 102. For severe threat 804, at 820 UE 102 sends a request to firewall 110, and at 822 firewall 110 identifies a severe threat and sends an "error (403)" message to UE 102.

In one embodiment, application server 312 is a WebLogic server that provides settings for threat protection functionality typically located in the "Protocols" configuration section. Such settings may be global, set per protocol, or set for a specific network channel. In one embodiment, the settings include maximum incoming message size, idle timeout, and complete message timeout. Maximum incoming message size is the maximum message size that the server will accept. Larger messages result in rejection and the connection being closed. Idle timeout is the maximum timeout that the server will wait for inactivity before closing a connection. Complete message timeout is the maximum timeout the server waits for receiving a complete message before aborting or closing the connection.

In one embodiment, the settings for the WebSockets are provided by APIs (e.g., by a "WebSocketApplication" class in WSC). These setting include maximum message size, idle timeout, and maximum allowed connections. Idle timeout is a configuration that is exposed in WSC configuration using "IdleTimeoutSeconds" parameter. Maximum allowed connections is a configuration that is exposed in WSC configuration using "MaxAllowedConnections" parameter.

One embodiment provides threat protection through a scripting language called "iRules" (a feature of BIG-IP for providing low level customization) which may be implemented at firewall 110 of FIG. 1 and/or at first firewall 304 within load balancer 302 of FIG. 3. The following example functionality provides an iRule that detects a specific HTTP status code returned by WCS 106 and blacklists the corresponding IP for a period of time.

```
# Drop connection for any blacklisted address
when CLIENT_ACCEPTED {
set srcip [IP::client_addr]
if { [table lookup -subtable "blacklist" $srcip] != " " } {
drop
return
}
}
# Blacklist IP on all 403 (Forbidden) responses
when HTTP_RESPONSE {
set srcip [IP::client_addr]
if { [HTTP::status] equals "403" } {
set holdtime 60
log "Blacklisting client $srcip for $holdtime seconds"
table add -subtable "blacklist" $srcip "403" indef $holdtime
}
}
```

FIG. 9 is a flow diagram of the operation of WSC 106 of FIG. 1 and/or threat protection module 16 of FIG. 2 when providing threat protection in accordance with embodiments of the present invention. In one embodiment, the functionality of the flow diagram of FIG. 9 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 902, signaling engine 108 receives a request of UE 102 according to a protocol, where the request has successfully traversed one or more security devices between UE 102 and WSC 106 (e.g., firewall 110). In one embodiment, WSC 106 records statistics 124 related to the request in a coherence cache. Statistics 124 include information on one or more of a history, a state, and users of business logic 122.

At 904, protocol handlers 112 determine whether the request includes a threat. In one embodiment, protocol handlers 112 send the request to threat database 128 which determines if the request includes a previously reported threat and indicates to protocol handlers 112 whether the request includes the threat. In one embodiment, threat database 128 examines the request against statistics 124 to identify threats.

At 906, when the request includes the threat, the threat is indicated to the one or more security devices. In one embodiment, the one or more security devices identify the threat via an integration point provided by WSC 106. The integration point includes one or more of a threat log, a threat alarm, or an HTTP status code. Based on the threat as indicated by the integration points, the one or more security devices implement corresponding threat protection.

At 908, when the request does not include the threat, the request is sent to application server 312. In one embodiment, depending on a type of the request and upon sending the request to application server 312, WSC 106 examines the request for threat protection by sending the request to one or more of protocol parses 336, filter chain 324, WSC connection filter 328, or security providers 320.

As disclosed, embodiments provide threat protection at the application layer of a WebRTC enabled gateway. Embodiments can be integrated and reused inside applications that expose web based protocols to leverage state and configuration of the applications. Embodiments make threat protection decisions based on history and state of the applications and the users, and can correlate threats corresponding to different protocols, users, IP addresses, servers, etc. Embodiments generally do not replace the need for firewalls, but work together with firewalls to provide an additional level of protection. This gives the end user the possibility of enhancing the protection of a gateway server by detecting and blocking threats as soon as possible and reducing the risk of system downtime or security breaches.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to provide threat protection for real-time communications (RTC), the threat protection comprising: receiving, by a signaling engine of a gateway, a request of a client according to a protocol, wherein, one or more security devices between the client and the gateway are configured to block requests when a threat is detected, the request has successfully traversed the one or more security devices without threat detection, and the one or more security devices identify a threat via an integration point, the integration point including a hypertext transfer protocol (HTTP) status code; determining, by a protocol handler of the gateway, whether the request includes invalid or poisonous data that defines a first threat, wherein a threat database indicates to the protocol handler whether the request includes the first threat, and the request is permitted to continue to a threat detection point at the gateway when the protocol handler determines that the request does not include the first threat; determining, by the threat detection point, whether the request includes invalid or poisonous data that defines the first threat; when the threat detection point determines that the request includes the first threat, indicating the first threat to the one or more security devices using the integration point by relaying a predetermined HTTP status code to the one or more security devices; when the threat detection point determines that the request does not include the first threat, transmitting an affirmation message about the request; and dynamically updating one or more rules used by the one or more security devices for threat detection, wherein, the one or more security devices are configured so that the relayed predetermined HTTP status code related to the request indicates to the one or more security devices that a threat has been detected for the request, and when the predetermined HTTP status code has been relayed, the rules are updated based on the detected threat indicated by the predetermined HTTP status code, and the one or more security devices are configured to implement the updated rules and block a subsequent request.

2. The computer readable medium of claim 1, wherein,
the signaling engine comprises the protocol handler,
the protocol handler corresponds to the protocol,
the protocol handler sends the request to the threat database and the threat database determines if the request includes a previously reported threat; and
when the protocol handler determines that the request does not include the first threat, the request is sent to an application server at the gateway.

3. The computer readable medium of claim 2,
wherein the gateway records statistics related to the request; and
wherein the statistics are recorded in a coherence cache and include information on one or more of a history, a state, or users of RTC applications at the gateway.

4. The computer readable medium of claim 3,
wherein the threat database examines the request against the statistics.

5. The computer readable medium of claim 2,
wherein, depending on a type of the request and upon sending the request to the application server, the gateway examines the request for the threat protection by sending the request to one or more of a protocol parses, a filter chain, a connection filter, or a security provider.

6. The computer readable medium of claim 1, wherein the first threat is associated with an authenticated user and the updated rules are configured to block the authenticated user or the first threat is associated with an application and the updated rules are configured to block the application.

7. The computer readable medium of claim 1, wherein the first threat comprises an application layer threat within a communication protocol stack implemented by the threat detection point.

8. A method of threat protection for real-time communications (RTC), comprising: receiving, by a signaling engine of a gateway, a request of a client according to a protocol, wherein one or more security devices between the client and the gateway are configured to block requests when a threat is detected, the request has successfully traversed the one or more security devices without threat detection, and the one or more security devices identify a threat via an integration point, the integration point including a hypertext transfer protocol (HTTP) status code; determining, by a protocol handler of the gateway, whether the request includes invalid or poisonous data that defines a first threat, wherein a threat database indicates to the protocol handler whether the request includes the first threat, and the request is permitted to continue to a threat detection point at the gateway when the protocol handler determines that the request does not include the first threat; determining, by the threat detection point whether the request includes invalid or poisonous data that defines the first threat; when the threat detection point determines that the request includes the first threat, indicating the first threat to the one or more security devices using the integration point by relaying a predetermined HTTP status code to the one or more security devices; when the threat detection point determines that the request does not include the first threat, transmitting an affirmation message about the request; and dynamically updating one or more rules used by the one or more security devices for threat detection, wherein, the one or more security devices are configured so that the relayed predetermined HTTP status code related to the request indicates to the one or more security devices that a threat has been detected for the request, when the predetermined HTTP status code has been relayed, the rules are updated based on the detected threat indicated by the predetermined HTTP status code, and the one or more security devices are configured to implement the updated rules and block a subsequent request.

9. The method of claim 8, wherein,
the signaling engine comprises the protocol handler,
the protocol handler corresponds to the protocol,
the protocol handler sends the request to the threat database and the threat database determines if the request includes a previously reported threat; and
when the protocol handler determines that the request does not include the first threat, the request is sent to an application server at the gateway.

10. The method of claim 9,
wherein the gateway records statistics related to the request;
wherein the statistics are recorded in a coherence cache and include information on one or more of a history, a state, or users of RTC applications at the gateway; and
wherein the threat database examines the request against the statistics.

11. The method of claim 9,
wherein, depending on a type of the request and upon sending the request to the application server, the gateway examines the request for the threat protection by sending the request to one or more of a protocol parses, a filter chain, a connection filter, or a security provider.

12. A system for threat protection of real-time communications (RTC), comprising: a processor; and a memory storing one or more programs for execution by the processor, the one or more programs including instructions for: receiving, by a signaling engine of a gateway, a request of a client according to a protocol, wherein, one or more security devices between the client and the gateway are configured to block requests when a threat is detected, the request has successfully traversed the one or more security devices without threat detection, and the one or more security devices identify a threat via an integration point, the integration point including a hypertext transfer protocol (HTTP) status code; determining, by a protocol handler of the gateway, whether the request includes invalid or poisonous data that defines a first threat, wherein a threat database indicates to the protocol handler whether the request includes the first threat, and the request is permitted to continue to a threat detection point at the gateway when the protocol handler determines that the request does not include the first threat; determining, by the threat detection point, whether the request includes invalid or poisonous data that defines the first threat; when the threat detection point determines that the request includes the first threat, indicating the first threat to the one or more security devices using the integration point by relaying a predetermined HTTP status code to the one or more security devices; when the threat detection point determines that the request does not include the first threat, transmitting an affirmation message about the request; and dynamically updating one or more rules used by the one or more security devices for threat detection, wherein, the one or more security devices are configured so that the relayed predetermined HTTP status code related to the request indicates to the one or more security devices that a threat has been detected for the request, and when the predetermined HTTP status code has been relayed, the rules are updated based on the detected threat indicated by the predetermined HTTP status code, and the one or more security devices are configured to implement the updated rules and block a subsequent request.

13. The system of claim 12, wherein,
the signaling engine comprises the protocol handler,
the protocol handler corresponds to the protocol,
the protocol handler sends the request to the threat database and the threat database determines if the request includes a previously reported threat; and
when the protocol handler determines that the request does not include the first threat, the request is sent to an application server at the gateway.

14. The system of claim 13,
wherein the gateway records statistics related to the request; and
wherein the statistics are recorded in a coherence cache and include information on one or more of a history, a state, or users of RTC applications at the gateway.

15. The computer readable medium of claim 6, wherein the one or more security devices are configured such that the provided HTTP status code indicates to update the rules to block the authenticated user associated with the first threat or the application associated with the first threat.

16. The computer readable medium of claim 7, wherein the first threat is detected by the threat detection point within a markup language data resource.

17. The computer readable medium of claim 7, wherein the threat detection point comprises one or more of a signaling engine at the gateway, a WebSocket connection handler at the gateway, a protocol parsers at the gateway, a protocol handler at the gateway, or business logic at the gateway, wherein the WebSocket connection handler detects a threat based on a size for a data file associated with the request exceeding a configurable threshold, the protocol parsers detect a threat within a data file associated with the request formatted according to a protocol implemented by the protocol parsers, and the business logic at the gateway detects a threat within a data file associated with the request formatted according to a protocol implemented by the business logic.

* * * * *

UNITED STATES PATENT AND TRADEMARK OFFICE
CERTIFICATE OF CORRECTION

Page 1 of 1

PATENT NO. : 10,530,831 B2
APPLICATION NO. : 14/713541
DATED : January 7, 2020
INVENTOR(S) : Johnsen et al.

It is certified that error appears in the above-identified patent and that said Letters Patent is hereby corrected as shown below:

In the Specification

In Column 7, Line 37, delete "anymessage," and insert -- any message, --, therefor.

In the Claims

In Column 17, Line 7, in Claim 8, after "point" insert -- , --.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*